United States Patent
Chen et al.

(10) Patent No.: US 10,141,558 B2
(45) Date of Patent: Nov. 27, 2018

(54) SEPARATOR FOR LITHIUM-ION BATTERY AND METHOD FOR PREPARING THE SAME

(71) Applicant: BYD COMPANY LIMITED, Shenzhen (CN)

(72) Inventors: Xiaofang Chen, Shenzhen (CN); Weifeng Miao, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 299 days.

(21) Appl. No.: 15/017,727

(22) Filed: Feb. 8, 2016

(65) Prior Publication Data

US 2016/0156010 A1    Jun. 2, 2016

Related U.S. Application Data

(63) Continuation of application No. PCT/CN2014/085299, filed on Aug. 27, 2014.

(30) Foreign Application Priority Data

Aug. 28, 2013 (CN) .......................... 2013 1 0381443

(51) Int. Cl.
    *H01M 2/16*     (2006.01)
    *H01M 2/14*     (2006.01)
    *H01M 10/0525*     (2010.01)

(52) U.S. Cl.
    CPC ......... *H01M 2/1686* (2013.01); *H01M 2/145* (2013.01); *H01M 2/166* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 4,434,215 A | 2/1984 | Wszolek et al. | |
| 2006/0173112 A1 | 8/2006 | Troelzsch et al. | |

(Continued)

FOREIGN PATENT DOCUMENTS

| | | | |
|---|---|---|---|
| CN | 1632968 A | 6/2005 | |
| CN | 101069302 A | 11/2007 | |

(Continued)

OTHER PUBLICATIONS

The World Intellectual Property Organization (WIPO) International Search Report for PCT/CN2014/085299 dated Dec. 3, 2014.

*Primary Examiner* — Wojciech Haske
(74) *Attorney, Agent, or Firm* — Anova Law Group, PLLC

(57) ABSTRACT

A separator for a lithium-ion battery includes a substrate, a coating, and a middle layer formed between the substrate and the coating. The middle layer includes a part of the substrate and a part of the coating. The substrate contains a base polymer, a first polymer, and a first inorganic material. The coating contains a second polymer and a second inorganic material. The first polymer and the second polymer independently contain an acid radical in a side chain thereof. The first inorganic material is reactive with the first polymer via a first neutralization reaction, and the second inorganic material is reactive with the second polymer via a second neutralization reaction. A method for preparing a separator for a lithium-ion battery and a lithium-ion battery are also provided.

20 Claims, 1 Drawing Sheet

(56) References Cited

U.S. PATENT DOCUMENTS

| | | |
|---|---|---|
| 2008/0287582 A1 | 11/2008 | Weiss |
| 2009/0269644 A1 | 10/2009 | Hamrock et al. |
| 2010/0173187 A1* | 7/2010 | Nishikawa ............ H01M 2/145 |
| | | 429/129 |
| 2011/0091774 A1 | 4/2011 | Wakizaka et al. |
| 2011/0318630 A1 | 12/2011 | Wakizaka et al. |
| 2013/0183549 A1 | 7/2013 | Kourtakis |
| 2013/0260207 A1* | 10/2013 | Uemura ................ H01M 2/16 |
| | | 429/144 |

FOREIGN PATENT DOCUMENTS

| | | |
|---|---|---|
| CN | 101733008 A | 6/2010 |
| CN | 201689929 U | 12/2010 |
| CN | 102459439 A | 5/2012 |
| CN | 102610773 A | 7/2012 |
| CN | 103236512 A | 8/2013 |

* cited by examiner

SEPARATOR FOR LITHIUM-ION BATTERY AND METHOD FOR PREPARING THE SAME

CROSS-REFERENCE TO RELATED APPLICATION

This application is a Continuation Application of International Application No. PCT/CN2014/085299, filed on Aug. 27, 2014, which claims priority to, and benefits of Chinese Patent Application No. 201310381443.5, filed with the State Intellectual Property Office of P. R. C. on Aug. 28, 2013, the entire content of which is incorporated herein by reference.

FIELD

Exemplary embodiments of the present disclosure relate generally to a lithium-ion battery technology field and, more particularly, to a separator for a lithium-ion battery, a method for preparing a separator, and a lithium-ion battery including the separator.

BACKGROUND

A separator for a lithium-ion secondary battery is generally made by thin and porous insulating material which has not only good ion permeability and mechanical strength but also long-term stability regarding to chemical substances and chemical solvents. Therefore, the positive electrode and the negative electrode of the battery are separated by the insulating separator, and a short circuit caused by the contact of the two electrodes can be prevented. Meanwhile, because the separator is porous, Li-ions (lithium ions) may pass through the separator easily. In this way, a good ion conductivity between the two electrodes may be ensured. When a short circuit or a wrong connection happens externally of the battery, an abnormal large current is generated inside the battery and the temperature in the battery is increased. When the temperature reaches a predetermined value, the separator is fused by heat and then the porous structures of the separator may be closed. Then the current may be cut off, and the battery may stop operating. In this way, the safety of the battery may be improved. Therefore, the separator has an important influence on the lifespan of the battery. Especially in a high power battery capable of obtaining large power and large current density without voltage interrupt in a short time, a good performance of the battery may be obtained by optimizing the performance of the positive and negative materials. The separator of such high power battery may be as thin as possible. When the lithium-ion battery is in a large current condition, however, a large number of lithium dendrites may be formed and the separator may be pierced by the lithium dendrites, thus causing a short circuit in the battery, which may cause a security problem accordingly. Therefore, a separator with a good high-temperature stability is necessary. Then a stable high power battery with excellent performances can be obtained.

At present, the separator is mainly formed by porous organic polymer film. A typical organic separator includes polyethylene (PE), polypropylene (PP), and three-layer (polypropylene/polyethylene/polypropylene) composite membrane. Such organic polyolefin separators have certain disadvantages, such as a low melting point (for example, the melting point of PE is 130° C., the melting point of PP is 180° C.), a low thermo-stability, and a relative low chemical stability in the lithium battery system. In addition, as the separator is contacted with lithium or lithium intercalated graphite in the lithium battery, the polyolefin separator may be corroded gradually.

Recently, the separator is improved by coating a ceramic heat resistant layer on a surface of the composite separator, in which the ceramic heat resistant layer contains ceramic particles and a binder, and an organic solvent having a good wettability with a porous flexible substrate may be adopted as a solvent. The solvent includes N-methylpyrrolidone, N,N-Dimethyl Acrylamide, N,N-dimethylformamide and dimethyl sulfoxide. Then the structure stability, thermostability and safety of the separator may be improved to some extent. For example, US patent application publication No. US2005084761 discloses electrical separators and a process for making them. The process for producing such separator comprises applying to a sheet-like flexible substrate having a plurality of openings a coating on and in said substrate, the material of said substrate being selected from woven or non-woven electrically nonconductive fibers of polymers and/or natural fibers and said coating being a porous electrically insulating ceramic coating. The said substrate is selected from nonwovens of polymeric and/or natural fibers and said coating is a porous ceramic coating brought onto and into said substrate by applying to said substrate a suspension comprising at least one oxide of the metals selected from the group consisting of Al, Zr, Si, Ti, Y and mixtures thereof and a sol and heating one or more times to solidify said suspension on and in said substrate. The said adhesion promoter is selected from the group consisting of 3-amino-propyltriethoxysilane, 2-aminoethyl-3-amino-propyltri-methoxysilane, 3-glycidyloxy-trimethoxysilane, 3-meth-acryloyloxypropyltrimethoxysilane, vinyltriethoxysilane, vinyltrimethoxysilane, vinyltris(2-methoxyethoxy) silane and mixtures thereof. The said ceramic coating is at least one selected from the group consisting of $BaTiO_3$, $Al_2O_3$, $SiO_2$ and $ZrO_2$.

The coating layer prepared according to the above-identified process has a relative low adhesion with the sheet-like flexible substrate. The ceramic layer is combined with the substrate just by the adhesive in the ceramic layer, and the bonding strength therebetween is relative low. Thus, particles of the coating layer are easy to fall off during processing and operating processes of the battery. Therefore, the high temperature resistance of the separator prepared by the above method is poor. The falling of the particles of the coating layer may cause performances of the separator to be uniform and may have bad effects on the consistency of the performance of the battery. Worse still, the transfer resistance to the lithium ions in the electrolyte may also be increased, which may be harmful to the fast charge-discharge of the battery. The lithium ions may be transferred onto the surface of the positive and/or negative electrode, which may affect the insertion and remove of the lithium ion. In addition, a pinhole which is possible to cause a short circuit in the battery may be formed in the separator. As can be concluded, performances and practical uses of the battery are seriously influenced.

SUMMARY

Embodiments of the present disclosure seek to solve at least one of the problems, such as a poor adhesion between a heat resistant layer and a substrate, particles of the heat resistant layer being easy to fall off.

According to a first aspect of embodiments of the present disclosure, a separator for a lithium-ion battery is provided. The separator for a lithium-ion battery includes: a substrate including a base polymer, a first polymer, and a first inorganic material; a coating including a second polymer and a second inorganic material; and a middle layer formed between the substrate and the coating and including a part of the substrate and a part of the coating, in which the first polymer and the second polymer independently include an acid radical in a side chain thereof, and the first inorganic material is reactive with the first polymer via a first neutralization reaction, and the second inorganic material is reactive with the second polymer via a second neutralization reaction.

According to the separator for a lithium-ion battery of embodiments of the present disclosure, the substrate contains the base polymer, the first polymer having an acid radical in a side chain thereof, and the first inorganic material. Then the toughness of the substrate is improved via a physical cross-linking between the first polymer and the first inorganic material. In addition, the coating contains the second inorganic material and the second polymer having an acid radical in a side chain thereof. The coating and the substrate have a similar molecular structure. Then a middle layer including a part of the substrate and a part of the coating may be obtained by hot-pressing the coating onto the substrate, and then the separator may be formed integrally. With the separator according to embodiments of the present disclosure, particles of the inorganic material (such as the first or second inorganic material) may not fall off into the electrolyte. Then fast lithium-ion migration may not be influenced, fallen particles may not adhere onto the surface of the positive or negative electrodes, and insertion and remove of the lithium ions may not be influenced. According to embodiments of the present disclosure, the separator for a lithium-ion battery has a relative good thermo-stability and safety.

According to a second aspect of embodiments of the present disclosure, a method for preparing a separator for a lithium-ion battery is provided. The method includes steps of: providing a substrate and a coating respectively, in which the substrate contains a base polymer, a first polymer and a first inorganic material, and the coating contains a second polymer and a second inorganic material; and providing the coating onto the substrate by hot-pressing so as to form a middle layer including a part of the substrate and a part of the coating and formed between the substrate and the coating. The first polymer and the second polymer independently contains an acid radical in a side chain thereof, the first inorganic material is reactive with the first polymer via a first neutralization reaction, and the second inorganic material is reactive with the second polymer via a second neutralization reaction.

With the method for preparing a separator for a lithium-ion battery according to embodiments of the present disclosure, the coating and the substrate may be formed integrally so as to obtain the separator. With this method, in the prepared separator, particles of the inorganic material (such as the first or second inorganic material) may be not easy to fall off into the electrolyte, and the stability and the safety of the battery may be both improved.

According to a third aspect of the present disclosure, a lithium-ion battery is provided. The lithium-ion battery includes: a shell; and an electrode assembly and electrolyte sealed in the shell, in which the electrode assembly includes the above-identified separator.

The lithium-ion battery according to embodiments of the present disclosure has improved thermo-stability and safety.

Additional aspects and advantages of embodiments of present disclosure will be given in part in the following descriptions, become apparent in part from the following descriptions, or be learned from the practice of the embodiments of the present disclosure.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure.

Unless otherwise defined, all technical and scientific terms used herein have the same meaning as commonly understood by one of ordinary skill in the art to which this disclosure belongs. In case of conflict, the specification, including definitions, will control.

In the description, terms such as "first" and "second" are used herein for purposes of description and are not intended to indicate or imply relative importance or significance. In addition, for the purpose of the present description and of the following claims, the definitions of the numerical ranges always include the extremes unless otherwise specified.

Figure 1:
FIG. 1 is a schematic diagram of an exemplary separator for a lithium-ion battery according to disclosed embodiments of the present disclosure.

According to a first aspect of embodiments of the present disclosure, a separator for a lithium-ion battery is provided. The separator for a lithium-ion battery includes a substrate, a coating, and a middle layer formed between the substrate and the coating. As shown in FIG. 1, a coating 3 is formed on a substrate 1, and a middle layer 2 is formed between the substrate 1 and the coating 3. The middle layer includes a part of the substrate and a part of the coating. In other words, the middle layer is formed by combining a part of the substrate and a part of the coating. The substrate contains a base polymer, a first polymer, and a first inorganic material. The coating contains a second polymer and a second inorganic material. The first polymer and the second polymer independently contain an acid radical in a side chain thereof, and the first inorganic material is reactive with the first polymer via a first neutralization reaction, and the second inorganic material is reactive with the second polymer via a second neutralization reaction.

It is to be noted that, the first and second neutralization reactions may be the same, or different from each other. The first and second neutralization reactions are independently depend on corresponding reactants, without particular limitations on the present disclosure.

Figure 2:
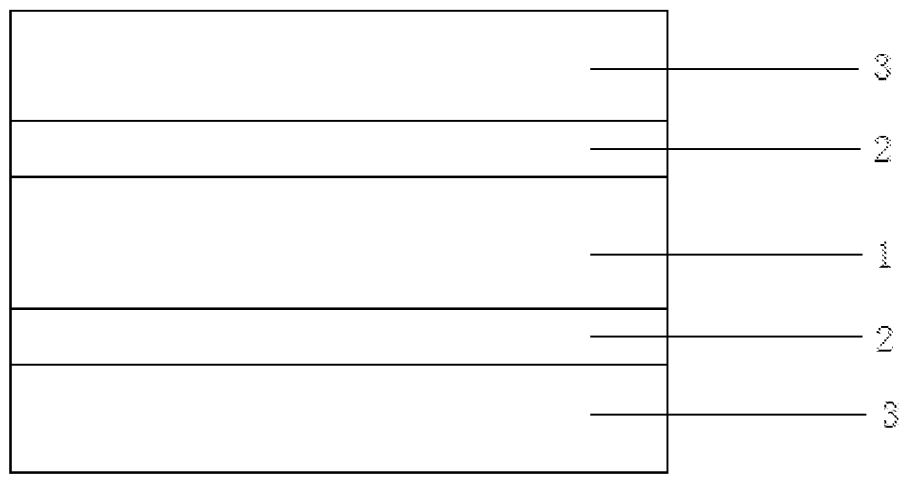
FIG. 2 is a schematic diagram of another exemplary separator for a lithium-ion battery according to disclosed embodiments of the present disclosure.

According to some embodiments of the present disclosure, the coating and the middle layer may be formed at one side of the substrate or at two sides of the substrate. In some embodiments, the separator includes two coatings formed at two sides of the substrate respectively. One of the two middle layers is formed between one of the two coatings and a first side surface of the substrate, and the other of the two middle layers is formed between the other of the two coatings and a second surface of the substrate. As shown in FIG. 2, coatings 3 are formed on both sides of the substrate 1, and two middle layers 2 are formed between the substrate 1 and the coatings 3, respectively.

In some embodiments of the present disclosure, the coating has a thickness ranging from 0.1 µm to 1 µm, and the middle layer has a thickness from 0.01 µm to 0.1 µm. It is to be noted that, the thickness in the present disclosure refers to a thickness of a layer (such as the coating or the middle layer) formed at one side of the substrate, for example, the coating formed at one side of the substrate has a thickness ranging from 0.1 µm to 1 µm, the middle layer formed at one side of the substrate has a thickness ranging from 0.01 µm to 0.1 µm. Then the separator may have a better ion conductivity and high-temperature stability, i.e., thermostability.

Those skilled in the art will appreciate that, since the separator is insulating, the separator has a quite high resistance. With a decrease of the thickness of the separator, both the resistance and the weight of the separator may be reduced. In some embodiments, the substrate has a thickness of less than 40 µm, alternatively ranging from 10 µm to 40 µm.

In the present disclosure, ion conductivity of the separator depends on the porosity of the separator, and the substrate with a large porosity may provide the separator with a large porosity, and then the separator may have a better ion conductivity. In some embodiments, the porosity of the substrate may be higher than 50%, alternatively, the porosity of the substrate ranges from 40% to 95%.

In some embodiments of the present disclosure, based on the total weight of the substrate, the amount of the first inorganic material is 1 wt % to 5 wt %, the amount of the first polymer is 2 wt % to 10 wt %, and the amount of the base polymer is 85 wt % to 97 wt %. With the above-identified amounts, the first inorganic material and the first polymer may be physically cross-linked each other, and the toughness of the substrate may be improved while the other performances of the separator may be not be influenced.

In some embodiments of the present disclosure, the first inorganic material has an average particle diameter ranging from 20 nm to 2 µm in diameter. Then a better physical crosslink between the first inorganic material and the first polymer may be formed, and the toughness of the substrate may be improved.

In some embodiments of the present disclosure, the coating further includes a third inorganic material unreactive with the second polymer. In other words, the third inorganic material does not react with the second polymer. In some embodiments, based on the total weight of the coating, the amount of the second polymer is 30 wt % to 50 wt %, the amount of the second inorganic material is 6 wt % to 15 wt %, and the amount of the third inorganic material is 44 wt % to 55 wt %. The second inorganic material may react with the second polymer via a neutralization reaction, so as to form a physical cross-linked net. Remaining second inorganic material and third inorganic material may fill the cross-linked net, so as to enhance the strength of the separator and provide the separator with better high temperature resistance.

There's no special limitation as to the first polymer and the second polymer in the present disclosure, provided a side chain of this polymer includes an acid radical. The acid radical may be at least one of carboxylic acid, sulfonic acid, mercapto acetic acid and phosphoric acid. A main chain of the polymer (such as the first polymer of the second polymer) may be at least one selected from the group consisting of polybutadiene, polystyrene, polyethylene and EPDM (Ethylene-Propylene-Diene Monomer) rubber. The first polymer and second polymer may independently be any combination of the above side-chain and main chain. In some embodiments of the present disclosure, the first polymer and the second polymer are independently selected from the group consisting of ethylene methacrylic acid copolymer, ethylene-acrylic acid copolymer, styrene-methacrylic acid copolymer, styrene-acrylic acid copolymer, ethylene propylene diene monomer rubber, sulfonated ethylene propylene diene monomer rubber, sulfonated butyl rubber, sulfonated butadiene styrene rubber, carboxylated polystyrene, sulfonated polystyrene, and any combinations thereof.

There is no particular limitation for the first inorganic material and the second inorganic material in the present disclosure, provided the first inorganic material is capable of reacting with the first polymer by neutralization (such as the first neutralization reaction) and the second inorganic material is capable of reacting with the second polymer by neutralization (such as the second neutralization reaction). In some embodiments, the first inorganic material and the second inorganic material are independently at least one alkali compound (for example, metal hydroxides) of metals selected from the group consisting of sodium, potassium, lithium, calcium, magnesium, copper, manganese, zinc, plumbum, cobalt, aluminum and cesium.

There is no particular limitation for the third inorganic material, provided the third inorganic material does not react with the second polymer. In some embodiments, the third inorganic material is at least one selected from the group consisting of aluminum oxide, titanium oxide, calcium oxide, zinc oxide, copper oxide and manganese oxide.

The base polymer may be any conventional base polymer used in a separator of a battery, such as polypropylene, polyethylene glycol terephthalate, polyimide and polyethylene.

According to a second aspect of the present disclosure, a method for preparing a separator for a lithium-ion battery is provided. The method for preparing a separator for a lithium-ion battery includes the following steps S1-S2.

At step S1, a substrate and a coating are provided respectively.

At step S2, the coating is applied onto the substrate by hot-pressing.

In some embodiments, the substrate contains a base polymer, a first polymer and a first inorganic material, and the coating contains a second polymer and a second inorganic material.

In some embodiments, the first polymer and the second polymer independently contain an acid radical in a side chain thereof. The first inorganic material is reactive with the first polymer via a first neutralization reaction, and the second inorganic material is reactive with the second polymer via a second neutralization reaction.

In some embodiments, a middle layer containing a part of the substrate and a part of the coating is formed between the substrate and the coating during the hot-pressing. In other words, during the hot-pressing, a part of the substrate and a part of the coating is combined to form the middle layer or transition layer between the coating and the substrate.

In some embodiments of the present disclosure, the hot-pressing is performed at a temperature ranging from 100° C. to 200° C. for 0.5 minutes to 2 minutes. Then the coating may be well bond onto the substrate.

There's no limitation as to the method for preparing the substrate. In some embodiments, the substrate is formed by melting the base polymer, the first polymer and the first inorganic material. In some embodiments, the substrate is obtained by mixing the base polymer with the first polymer and the first inorganic polymer to form a mixture, and then subjecting the mixture to spinning.

In some embodiments, the coating is formed by melting the second polymer and the second inorganic material.

In some embodiments of the present disclosure, the coating further includes a third inorganic material unreactive with the second polymer, i.e., the third inorganic material does not react with the second polymer.

In some embodiments of the present disclosure, the first polymer and the second polymer are independently selected from the group consisting of ethylene methacrylic acid copolymer, ethylene-acrylic acid copolymer, styrene-methacrylic acid copolymer, styrene-acrylic acid copolymer, ethylene propylene diene monomer rubber, sulfonated ethylene propylene diene monomer rubber, sulfonated butyl rubber, sulfonated butadiene styrene rubber, carboxylated polystyrene, sulfonated polystyrene, and any combinations thereof.

In some embodiments, the first inorganic material and the second inorganic material are independently at least one alkali compound of metals selected from the group consisting of sodium, potassium, lithium, calcium, magnesium, copper, manganese, zinc, plumbum, cobalt, aluminum and cesium.

In some embodiments, the third inorganic material is at least one selected from the group consisting of aluminum oxide, titanium oxide, calcium oxide, zinc oxide, copper oxide and manganese oxide.

In some embodiments of the present disclosure, based on the total weight of the substrate, the amount of the first inorganic material is 1 wt % to 5 wt %, the amount of the first polymer is 2 wt % to 10 wt %, and the amount of the base polymer is 85 wt % to 97 wt %.

In some embodiments of the present disclosure, based on the total weight of the coating, the amount of the second polymer is 30 wt % to 50 wt %, the amount of the second inorganic material is 6 wt % to 15 wt %, and the amount of the third inorganic material is 44 wt % to 55 wt %.

In some embodiments of the present disclosure, in the hot-pressing step, two coatings are provided and two middle layers are formed. One of the two middle layers is formed between one of the two coatings and a first side surface of the substrate, and the other of the two middle layers is formed between the other of the two coatings and a second surface of the substrate.

In some embodiments of the present disclosure, the substrate has a thickness ranging from 10 μm to 40 μm, the coating has a thickness ranging from 0.1 μm to 1 μm, and the middle layer has a thickness ranging from 0.01 μm to 0.1 μm.

In some embodiments of the present disclosure, the substrate has a porosity ranging from 40% to 95%.

In some embodiments of the present disclosure, the average particle diameter of the first inorganic material ranges from 20 nm to 2 am.

According to a third aspect of the present disclosure, a lithium-ion battery is provided. The lithium-ion battery includes a shell, an electrode assembly and electrolyte sealed in the shell. The electrode assembly includes the above-identified separator.

Those with ordinary skill in the art will understand that, the lithium-ion battery includes positive and negative electrodes disposed within the shell. According to the lithium-ion battery of embodiments of the present disclosure, there's no special limit to positive and negative electrodes, the shell, and structure relationship between the electrodes and the shell. The positive and negative electrodes may be any conventional electrodes generally used in batteries.

For example, a positive electrode has a positive current collector and a positive material disposed on the positive current collector. The positive current collector may be any one of aluminum foil, copper foil, steel strip plated with nickel, and punched steel strip. The positive material includes a positive active material and a positive adhesive. The positive active material may be at least one selected from the group consisting of $LiCoO_2$, $LiNiO_2$, $LiMn_2O_4$ and $LiFePO_4$, and the positive adhesive may be at least one selected from fluorine-containing resin and polyolefine compounds, such as at least one selected from polyvinylidene fluoride (PVDF), polytetrafluoroethylene (PTFE) or styrene-butadiene rubber (SBR). Based on the weight of the positive active material, the amount of the positive adhesive is from 0.01 wt % to 8 wt %, alternatively from 1 wt % to 5 wt %.

The negative electrode has a negative current collector and a negative material layer coated on the negative current collector. The negative material layer includes a negative active material, a negative adhesive, and an optional conductive agent. The negative active material may be at least one selected from the group consisting of lithium metal, lithium alloy, graphite, carbon fiber, hard carbon, silicon alloy and iron phosphide. The conductive agent may be at least one selected from the group consisting of carbon black, nickel powder and copper powder. The negative adhesive may be at least one selected from the group consisting of polyvinyl alcohol, polytetrafluoroethylene, hydroxymethyl cellulose (CMC) and styrene butadiene rubber (SBR). Based on the weight of the negative active material, the amount of the negative adhesive is from 0.5 wt % to 8 wt %, alternatively from 2 wt % to 5 wt %. Based on the weight of the negative material layer, the amount of the conductive agent is from 0.1 wt % to 12 wt %.

The method for preparing the positive and negative electrodes is well known to those with ordinary skill in the art, thus details thereof are omitted herein.

In some embodiments, the electrolyte is a non-aqueous electrolyte, i.e., the solution formed by dissolving a lithium salt in a non-aqueous solvent. The lithium salt may be at least one selected from the group consisting of $LiPF_6$, $LiClO_4$, $LiBF_4$, $LiAsF_6$, $LiSiF_6$, $LiB(C_6H_5)_4$, LiCl, LiBr, $LiAlCl_4$, $LiC(SO_2CF_3)_3$, $LiCH_3SO_3$ and $LiN(So_2CF_3)_2$. The non-aqueous solvent may be at least one selected from the group consisting of ethylene carbonate (EC), propylene carbonate (PC), dimethyl carbonate (DMC), vinylene carbonate (VC) and diethyl carbonate (DEC). In some embodiments, the non-aqueous solvent is a mixture of EC, PC and DEC. In some embodiments, the EC:PC:DEC volume ratio is 3:2:5. In some embodiments, in the non-aqueous electrolyte, the lithium salt has a concentration of 0.1 mol/L to 2 mol/L, alternatively 0.8 mol/L to 1.2 mol/L.

The method for preparing the battery is known in the art. In general, the method includes the steps of: disposing the electrodes in the shell, adding the electrolyte into the shell, then sealing the opening of the shell. The method of sealing and the amount of the electrolyte are both well known in the art, thus details thereof are omitted herein.

Some illustrative and non-limiting examples are provided hereunder for a better understanding of the present invention and for its practical embodiment.

Example 1

The present example provides a separator A1 for a lithium-ion battery S1 and a method for preparing the separator.

I. Preparation of Separator

1) Preparation of Substrate

Ethylene acrylic acid (EAA) copolymer and hydrotalcite (having an average particle diameter of 57 nm) were mixed, and then extruded by a single screw extruder with a revolving speed of 150 r/min at 170° C. to obtain EAA/Layered Double Hydroxides (LDH) particles. The EAA/LDH particles were mixed with polyethylene, and then extruded by a twin-screw extruder with a revolving speed of 300 r/min to obtain a substrate material. Then the substrate material was subjected to a spinning process to form a substrate. The substrate had a thickness of 40 μm, a porosity 41%, an amount of EAA copolymer being 10 wt %, and an amount of hydrotalcite being 5 wt %.

2) Preparation of Coating

EAA copolymer, hydrotalcite and aluminum oxide were mixed, and then extruded by a single screw extruder with a revolving speed of 150 r/min at 170° C. to obtain a coating. Based on the total weight of the coating, the amount of the EAA copolymer was 43 wt %, the amount of the hydrotalcite was 12 wt %, and the amount of the aluminum oxide was 45 wt %.

3) Hot-Pressing

Two coatings were provided onto the substrate by hot-pressing, and two middle layers each containing a part of the substrate and a part of the coating were formed. One middle layer was formed between one coating and one surface of the substrate, while the other middle layer was formed between the other coating and another surface of the substrate. The thickness of the coating was 0.9 μm, and the thickness of the middle layer was 0.08 μm. Finally, the separator S1 was obtained.

II. Preparation of Battery

A battery was prepared by using LiCoO2 as a positive electrode, graphite used as a negative electrode, the separator of process I, LiPF6 solution at a concentration of 1 mol/L as an electrolyte, and a mixed solution with an EC/PC/DEC volume ratio of 30/20/50 as a solvent. The positive electrode and the negative electrode were disposed on the two sides of the separator, wound into a sheet, cut into a predetermined size, and then placed within a shell. After an opening of the shell was sealed, a lithium-ion secondary battery S1 was obtained.

Example 2

The present example provides a separator A2 for a lithium-ion battery S2 and a method for preparing the separator. The method for preparing the separator and the battery were substantially the same with those in Example 1, with the following differences.

The substrate was made by styrene-acrylic copolymer and calcium hydroxide (having an average particle diameter of 500 nm). The substrate had a thickness of 30 μm, a porosity 60%, an amount of styrene-acrylic copolymer being 6 wt %, and an amount of calcium hydroxide being 2 wt %.

The coating was made by EPDM rubber, calcium hydroxide and calcium oxide. Based on the total weight of the coating, the amount of the EPDM rubber was 35 wt %, the amount of the calcium hydroxide was 10 wt %, and the amount of the calcium oxide was 55 wt %. The thickness of the coating was 0.57 μm, and the thickness of the middle layer was 0.03 μm.

Example 3

The present example provides a separator A3 for a lithium-ion battery S3 and a method for preparing the separator. The method for preparing the separator and the battery were substantially the same with those in Example 1, with the following differences.

The substrate was made by carboxylated polystyrene and aluminum hydroxide (having an average particle diameter of 220 nm). The substrate had a thickness of 25 μm, a porosity 70%, an amount of carboxylated polystyrene being 9 wt %, and an amount of aluminum hydroxide being 4 wt %.

The coating was made by sulfonated styrene butadiene rubber, aluminum hydroxide and aluminum oxide. Based on the total weight of the coating, the amount of the sulfonated styrene butadiene rubber was 45 wt %, the amount of the aluminum hydroxide was 8 wt %, and the amount of the aluminum oxide was 47 wt %. The thickness of the coating was 0.82 μm, and the thickness of the middle layer was 0.07 μm.

Example 4

The present example provides a separator A4 for a lithium-ion battery S4 and a method for preparing the separator. The method for preparing the separator and the battery were substantially the same with those in Example 1, with the following differences.

The substrate was made by EPDM rubber and magnesium hydroxide (having an average particle diameter of 394 nm). The substrate had a thickness of 30 μm, a porosity 60%, an amount of EPDM rubber being 6 wt %, and an amount of magnesium hydroxide being 2 wt %.

The coating was made by sulfonated EPDM rubber, magnesium hydroxide and calcium oxide. Based on the total weight of the coating, the amount of the sulfonated EPDM rubber was 30 wt %, the amount of the magnesium hydroxide was 15 wt %, and the amount of the calcium oxide was 55 wt %. The thickness of the coating was 0.58 μm, and the thickness of the middle layer was 0.03 μm.

Example 5

The present example provides a separator A5 for a lithium-ion battery S5 and a method for preparing the separator. The method for preparing the separator and the battery were substantially the same with those in Example 1, with the following differences.

The substrate was made by styrene-methacrylic copolymer and potassium hydroxide (having an average particle diameter of 846 nm). The substrate had a thickness of 36 μm, a porosity 50%, an amount of styrene-methacrylic copolymer being 5 wt %, and an amount of potassium hydroxide being 2.5 wt %.

The coating was made by ethylene-methacrylic acid copolymer, potassium hydroxide and titanium oxide. Based on the total weight of the coating, the amount of the ethylene-methacrylic acid copolymer was 40 wt %, the amount of the potassium hydroxide was 10 wt %, and the amount of the titanium oxide was 50 wt %. The thickness of the coating was 0.56 m, and the thickness of the middle layer was 0.05 m.

Example 6

The present example provides a separator A6 for a lithium-ion battery S6 and a method for preparing the separator. The method for preparing the separator and the battery were substantially the same with those in Example 1, with the following differences.

The substrate was made by ethylene-methacrylic acid copolymer and sodium hydroxide (having an average particle diameter of 1.87 µm). The substrate had a thickness of 10 µm, a porosity 89%, an amount of ethylene-methacrylic acid copolymer being 2 wt %, and an amount of sodium hydroxide being 1 wt %.

The coating was made by ethylene-methacrylic acid copolymer, sodium hydroxide and aluminum oxide. Based on the total weight of the coating, the amount of the ethylene-methacrylic acid copolymer was 50 wt %, the amount of the sodium hydroxide was 6 wt %, and the amount of the aluminum oxide was 44 wt %. The thickness of the coating was 0.67 µm, and the thickness of the middle layer was 0.04 µm.

Example 7

The present example provides a separator A7 for a lithium-ion battery S7 and a method for preparing the separator. The method for preparing the separator and the battery were substantially the same with those in Example 1, with the following differences.

The substrate was made by styrene-acrylic copolymer and lithium hydroxide (having an average particle diameter of 1.2 µm). The substrate had a thickness of 20 µm, a porosity 80%, an amount of styrene-acrylic copolymer being 8 wt %, and an amount of lithium hydroxide being 3 wt %.

The coating was made by ethylene-methacrylic acid copolymer, sodium hydroxide and aluminum oxide. Based on the total weight of the coating, the amount of the styrene-acrylic copolymer was 32 wt %, the amount of the lithium hydroxide was 13 wt %, and the amount of the titanium oxide was 55 wt %. The thickness of the coating was 0.41 µm, and the thickness of the middle layer was 0.01 µm.

Example 8

The present example provides a separator A8 for a lithium-ion battery S8 and a method for preparing the separator. The method for preparing the separator and the battery were substantially the same with those in Example 1, with the following differences.

The substrate was made by sulfonated EPDM rubber and copper hydroxide (having an average particle diameter of 260 nm). The substrate had a thickness of 35 am, a porosity 50%, an amount of sulfonated EPDM rubber being 7 wt %, and an amount of copper hydroxide being 2.5 wt %.

The coating was made by styrene-methacrylic copolymer, copper hydroxide and copper oxide. Based on the total weight of the coating, the amount of the styrene-methacrylic copolymer was 37 wt %, the amount of the copper hydroxide was 9 wt %, and the amount of the copper oxide was 54 wt %. The thickness of the coating was 0.67 µm, and the thickness of the middle layer was 0.04 µm.

Example 9

The present example provides a separator A9 for a lithium-ion battery S9 and a method for preparing the separator. The method for preparing the separator and the battery were substantially the same with those in Example 1, with the following differences.

The substrate was made by sulfonated butyl rubber and manganese hydroxide (having an average particle diameter of 19 nm). The substrate had a thickness of 25 µm, a porosity 70%, an amount of sulfonated butyl rubber being 4 wt %, and an amount of manganese hydroxide being 3.5 wt %.

The coating was made by sulfonated butyl rubber, manganese hydroxide and manganese oxide. Based on the total weight of the coating, the amount of the sulfonated butyl rubber was 39 wt %, the amount of the manganese hydroxide was 7 wt %, and the amount of the manganese oxide was 54 wt %. The thickness of the coating was 0.77 µm, and the thickness of the middle layer was 0.05 µm.

Example 10

The present example provides a separator A10 for a lithium-ion battery S10 and a method for preparing the separator. The method for preparing the separator and the battery were substantially the same with those in Example 1, with the following differences.

The substrate was made by sulfonated styrene-butadiene rubber and zinc hydroxide (having an average particle diameter of 1.36 µm). The substrate had a thickness of 15 µm, a porosity 83%, an amount of sulfonated styrene-butadiene rubber being 3 wt %, and an amount of zinc hydroxide being 1.5 wt %.

The coating was made by carboxylated polystyrene and zinc hydroxide. Based on the total weight of the coating, the amount of the carboxylated polystyrene was 50 wt %, and the amount of the zinc hydroxide was 50 wt %. The thickness of the coating was 0.87 µm, and the thickness of the middle layer was 0.06 µm.

Example 11

The present example provides a separator A11 for a lithium-ion battery S11 and a method for preparing the separator. The method for preparing the separator and the battery were substantially the same with those in Example 1, with the following differences.

The substrate was made by sulfonated polystyrene and cobalt hydroxide (having an average particle diameter of 490 nm). The substrate had a thickness of 30 µm, a porosity 60%, an amount of sulfonated polystyrene being 6 wt %, and an amount of cobalt hydroxide being 3 wt %.

The coating was made by sulfonated polystyrene and cobalt hydroxide. Based on the total weight of the coating, the amount of the sulfonated polystyrene was 30 wt %, and the amount of the cobalt hydroxide was 70 wt %.

The coating was applied onto the substrate by hot-pressing, and a middle layer containing a part of the substrate and a part of the coating was formed between the coating and a surface of the substrate. The thickness of the coating was 0.47 µm, and the thickness of the middle layer was 0.02 µm.

Comparative Example 1

The present example provides a separator DS1 for a lithium-ion battery CS1 and a method for preparing the separator.

I. Preparation of Separator
1) Preparation of Substrate

A substrate was formed by a spinning process using polyethylene. Thickness of the substrate was 35 µm, the porosity of the substrate was 50%.

2) Preparation of Slurry 1 weight part of epoxy resin E-51, 39 weight parts of N-methylpyrrolidone, and 10 weight parts of Al2O3 were mixed, and then grinded in a ball mill, until the average particle diameter of the Al2O3 was 200 nm, and the surface area of the Al2O3 was 10 m2/g.

3) Preparation of Slurry Layer

The substrate of step 1 was immersed in the slurry of step 2 for 5 minutes. After taken out of the slurry, two slurry layers each having a thickness of 0.88 m were formed on two side surfaces of the substrate respectively. The resulted substrate was dried at 120° C. for 20 minutes. The thickness of the coating was 0.79 μm. Finally, the separator DS1 was obtained.

II. Preparation of Battery

The battery CS1 was prepared with substantially the same steps as those in EXAMPLE 1, with the exception that the separator DS1 was used.

Tests

1. Thickness

The thickness of the separator was measured by a contact thickness meter having an accuracy of 0.01 μm. The separators A1-11 and CA1 were measured, and the results are shown in Table 1.

2. Pore Size

The pore size of the separator was measured by a scanning electron microscopy. The separators A1-11 and CA1 were measured, and the results are shown in Table 1.

3. Porosity

The porosity of the separator was measured by a mercury porosimeter. The separators A1-11 and CA1 were measured, and the results are shown in Table 1.

4. Cycling Performance

The cycling performance of a battery was detected by a cycling test. The cycling test includes subjecting the battery to a 1C/2C charge-discharge cycle at 60° C., the rate of residual capacity of the battery was recorded after the cycle was performed for the following times: 100 times, 200 times, and 300 times. The lithium-ion batteries S1-S11 and CS1 were measured, and the results are shown in Table 2.

5. Safety Performance

The safety performance of a battery was detected by a high temperature test. The high temperature test includes heating the battery in a sealed drying oven at the temperatures shown in Table 3 for a time shown in Table 3. The lithium-ion batteries S1-S11 and CS1 were measured, and the results are shown in Table 2.

TABLE 1

|  | Thickness (μm) | Average Pore Size (nm) | Porosity (%) |
| --- | --- | --- | --- |
| A1 | 41.94 | 330 | 39 |
| A2 | 31.18 | 360 | 43 |
| A3 | 26.73 | 350 | 42 |
| A4 | 31.21 | 360 | 42 |
| A5 | 36.2 | 340 | 40 |
| A6 | 11.39 | 405 | 47 |
| A7 | 20.83 | 420 | 49 |
| A8 | 36.4 | 375 | 46 |
| A9 | 26.61 | 370 | 46 |
| A10 | 16.84 | 345 | 41 |
| A11 | 30.48 | 410 | 40 |
| CA1 | 36.58 | 340 | 39 |

TABLE 2

|  | 100 cycle (%) | 200 cycle (%) | 300 cycle (%) |
| --- | --- | --- | --- |
| S1 | 98 | 94 | 93 |
| S2 | 98 | 95 | 93 |
| S3 | 98 | 96 | 94 |
| S4 | 98 | 96 | 93 |
| S5 | 99 | 96 | 94 |
| S6 | 98 | 95 | 93 |
| S7 | 98 | 94 | 92 |
| S8 | 97 | 95 | 94 |
| S9 | 97 | 94 | 93 |
| S10 | 99 | 96 | 94 |
| S11 | 98 | 94 | 92 |
| CS1 | 98 | 94 | 92 |

TABLE 3

|  | 150° C./1 hr | 150° C./2 hr | 160° C./1 hr | 160° C./2 hr | 170° C./1 hr | 170° C./2 hr |
| --- | --- | --- | --- | --- | --- | --- |
| S1 | OK | OK | OK | OK | OK | OK |
| S2 | OK | OK | OK | OK | OK | NG |
| S3 | OK | OK | OK | OK | OK | OK |
| S4 | OK | OK | OK | OK | OK | NG |
| S5 | OK | OK | OK | OK | OK | NG |
| S6 | OK | OK | OK | OK | OK | NG |
| S7 | OK | OK | OK | OK | NG | NG |
| S8 | OK | OK | OK | OK | OK | OK |
| S9 | OK | OK | OK | OK | OK | OK |
| S10 | OK | OK | OK | OK | OK | OK |
| S11 | OK | OK | OK | NG | NG | NG |
| CS1 | OK | OK | NG | NG | NG | NG |

OK: the high temperature test is passed
NG: fire or explosion
200° C./2 h: heating a battery at 200° C. for 2 h As shown in Tables 1-3, the separator according to embodiments of the present disclosure may be thinner, have higher thermo-stability than the comparative example. In addition, particles of the coating of the separator may not be easy to fall off. The separator may be easier to wind, to prepare and to apply in practical use. The batteries according to embodiments of the present disclosure have good high temperature cycling performances and an excellent thermo-stability.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although the disclosure has been described in detail with reference to several embodiments, additional variations and modifications exist within the scope and spirit of the disclosure as described and defined in the following claims.

Many modifications and other embodiments of the present disclosure will come to mind to one skilled in the art to which the present disclosure pertains having the benefit of the teachings presented in the foregoing description. It will be apparent to those skilled in the art that variations and modifications of the present disclosure can be made without departing from the scope or spirit of the present disclosure. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A separator for a lithium-ion battery, comprising:
   a substrate comprising a base polymer, a first polymer, and a first inorganic material;
   a coating comprising a second polymer and a second inorganic material; and
   a middle layer formed between the substrate and the coating and comprising a part of the substrate and a part of the coating, wherein
   the first polymer and the second polymer independently comprise an acid radical in a side chain thereof, the first inorganic material is reactive with the first polymer via a first neutralization reaction, and the second inorganic material is reactive with the second polymer via a second neutralization reaction.

2. The separator according to claim 1, wherein the separator comprises two coatings and two middle layers, one of the two middle layers is formed between one of the two coatings and a first side surface of the substrate, and the other of the two middle layers is formed between the other of the two coatings and a second surface of the substrate.

3. The separator according to claim 1, wherein the substrate has a thickness ranging from 10 μm to 40 μm, the coating has a thickness ranging from 0.1 μm to 1 μm, and the middle layer has a thickness ranging from 0.01 μm to 0.1 μm.

4. The separator according to claim 3, wherein the substrate has a porosity ranging from 40% to 95%.

5. The separator according to claim 1, wherein based on a total weight of the substrate, an amount of the first inorganic material is 1 wt % to 5 wt %, an amount of the first polymer is 2 wt % to 10 wt %, and an amount of the base polymer is 85 wt % to 97 wt %.

6. The separator according to claim 5, wherein the first inorganic material has an average particle diameter ranging from 20 nm to 2 μm.

7. The separator according to claim 6, wherein the coating further comprises a third inorganic material unreactive with the second polymer; and
   based on a total weight of the coating, an amount of the second polymer is 30 wt % to 50 wt %, an amount of the second inorganic material is 6 wt % to 15 wt %, and an amount of the third inorganic material is 44 wt % to 55 wt %.

8. The separator according to claim 1, wherein the first polymer and the second polymer are independently selected from a group consisting of ethylene-methacrylic acid copolymer, ethylene-acrylic acid copolymer, styrene-methacrylic acid copolymer, styrene-acrylic acid copolymer, ethylene propylene diene monomer rubber, sulfonated ethylene propylene diene monomer rubber, sulfonated butyl rubber, sulfonated butadiene styrene rubber, carboxylated polystyrene, sulfonated polystyrene, and combinations thereof.

9. The separator according to claim 8, wherein the first inorganic material and the second inorganic material independently comprise at least one alkali compound of metals selected from the group consisting of sodium, potassium, lithium, calcium, magnesium, copper, manganese, zinc, plumbum, cobalt, aluminum and cesium; and
   the third inorganic material is at least one selected from a group consisting of aluminum oxide, titanium oxide, calcium oxide, zinc oxide, copper oxide and manganese oxide.

10. A method for preparing a separator for a lithium-ion battery, comprising steps of:
    providing a substrate and a coating respectively, wherein the substrate comprises a base polymer, a first polymer and a first inorganic material, and the coating comprises a second polymer and a second inorganic material; and
    providing the coating onto the substrate by hot-pressing so as to form a middle layer comprising a part of the substrate and a part of the coating and formed between the substrate and the coating, wherein
    the first polymer and the second polymer independently comprise an acid radical in a side chain thereof, the first inorganic material is reactive with the first polymer via a first neutralization reaction, and the second inorganic material is reactive with the second polymer via a second neutralization reaction.

11. The method according to claim 10, wherein the hot-pressing is performed at a temperature of 100° C. to 200° C. for 0.5 minutes to 2 minutes.

12. The method according to claim 10, wherein the coating further comprises a third inorganic material unreactive with the second polymer.

13. The method according to claim 12, wherein the first polymer and the second polymer are independently selected from a group consisting of ethylene-methacrylic acid copolymer, ethylene-acrylic acid copolymer, styrene-methacrylic acid copolymer, styrene-acrylic acid copolymer, ethylene propylene diene monomer rubber, sulfonated ethylene propylene diene monomer rubber, sulfonated butyl rubber, sulfonated butadiene styrene rubber, carboxylated polystyrene, sulfonated polystyrene, and combinations thereof;
    the first inorganic material and the second inorganic material independently comprise at least one alkali compound of metals selected from a group consisting of sodium, potassium, lithium, calcium, magnesium, copper, manganese, zinc, plumbum, cobalt, aluminum and cesium; and
    the third inorganic material is at least one selected from a group consisting of aluminum oxide, titanium oxide, calcium oxide, zinc oxide, copper oxide and manganese oxide.

14. The method according to claim 12, wherein based on a total weight of the substrate, an amount of the first inorganic material is 1 wt % to 5 wt %, an amount of the first polymer is 2 wt % to 10 wt %, and an amount of the base polymer is 85 wt % to 97 wt %; and
    based on a total weight of the coating, an amount of the second polymer is 30 wt % to 50 wt %, an amount of the second inorganic material is 6 wt % to 15 wt %, and an amount of the third inorganic material is 44 wt % to 55 wt %.

15. The method according to claim 10, wherein in the hot-pressing step, two coatings are provided and two middle layers are formed, one of the two middle layers is formed between one of the two coatings and a first side surface of the substrate, and the other of the two middle layers is formed between the other of the two coatings and a second surface of the substrate.

16. The method according to claim 10, wherein the substrate has a thickness ranging from 10 μm to 40 μm, the coating has a thickness ranging from 0.1 μm to 1 μm, and the middle layer has a thickness ranging from 0.01 μm to 0.1 μm.

17. The method according to claim 16, wherein the substrate has a porosity ranging from 40% to 95%.

18. The method according to claim 10, wherein the first inorganic material has an average particle diameter ranging from 20 nm to 2 μm.

19. The method according to claim 10, wherein the substrate is provided by melting the base polymer, the first polymer and the first inorganic material, and the coating is provided by melting the second polymer and the second inorganic material.

20. A lithium-ion battery comprising:
a shell; and
an electrode assembly and electrolyte sealed in the shell, wherein the electrode assembly including a separator, comprising:
  a substrate including a base polymer, a first polymer, and a first inorganic material;
  a coating including a second polymer and a second inorganic material; and
  a middle layer formed between the substrate and the coating and including a part of the substrate and a part of the coating, wherein the first polymer and the second polymer independently comprise an acid radical in a side chain thereof, the first inorganic material is reactive with the first polymer via a first neutralization reaction, and the second inorganic material is reactive with the second polymer via a second neutralization reaction.

* * * * *